United States Patent [19]
Dakin

[11] Patent Number: 4,885,462
[45] Date of Patent: Dec. 5, 1989

[54] OPTICAL FIBER SENSING SYSTEMS
[75] Inventor: John P. Dakin, Hampshire, England
[73] Assignee: Plessey Overseas Limited, Ilford, England
[21] Appl. No.: 160,601
[22] PCT Filed: Apr. 22, 1987
[86] PCT No.: PCT/GB87/00265
§ 371 Date: Feb. 16, 1988
§ 102(e) Date: Feb. 16, 1988
[87] PCT Pub. No.: WO87/06690
PCT Pub. Date: Nov. 5, 1987

[30] Foreign Application Priority Data
Apr. 22, 1986 [GB] United Kingdom ............... 8609732

[51] Int. Cl.⁴ .................................................. H01J 5/16
[52] U.S. Cl. .................................. 250/227; 250/231 R
[58] Field of Search ........................... 250/227, 231 R; 356/73.1, 345; 73/705

[56] References Cited
U.S. PATENT DOCUMENTS

| | | | |
|---|---|---|---|
| 4,545,253 | 10/1985 | Avicola | 73/655 |
| 4,632,551 | 12/1986 | Pavlath | 250/227 |
| 4,725,143 | 2/1986 | Jones et al. | 250/227 |
| 4,755,668 | 7/1988 | Davis | 250/227 |
| 4,775,216 | 10/1988 | Layton | 250/227 |
| 4,787,741 | 11/1988 | Udd et al. | 356/345 |

FOREIGN PATENT DOCUMENTS
0092367 10/1983 European Pat. Off. .
2122337 1/1984 United Kingdom .

Primary Examiner—David C. Nelms
Assistant Examiner—Stephone B. Allen
Attorney, Agent, or Firm—Fleit, Jacobson, Cohn, Price, Holman & Stern

[57] ABSTRACT

An optical fiber sensing system for measuring the location and/or magnitude of an external parameter acting at a single point along an optical fiber loop sensor. The system comprises light source means for producing light for propagation in opposite directions around the loop sensor and directional coupler means for coupling the light source means and detector means to the loop sensor and to other optical fiber interfering paths of the system. The detector means are arranged for measuring a phase change (x) between interfering light signals propagating around the sensor loop in opposite directions and for simultaneously measuring a phase change (y) experienced by the light propagating around the loop sensor in one direction. By computation or otherwise, the rate of change of the phase change (x) can be derived and by the use of an algorithm the location and/or magnitude of the applied parameter can be determined.

5 Claims, 1 Drawing Sheet

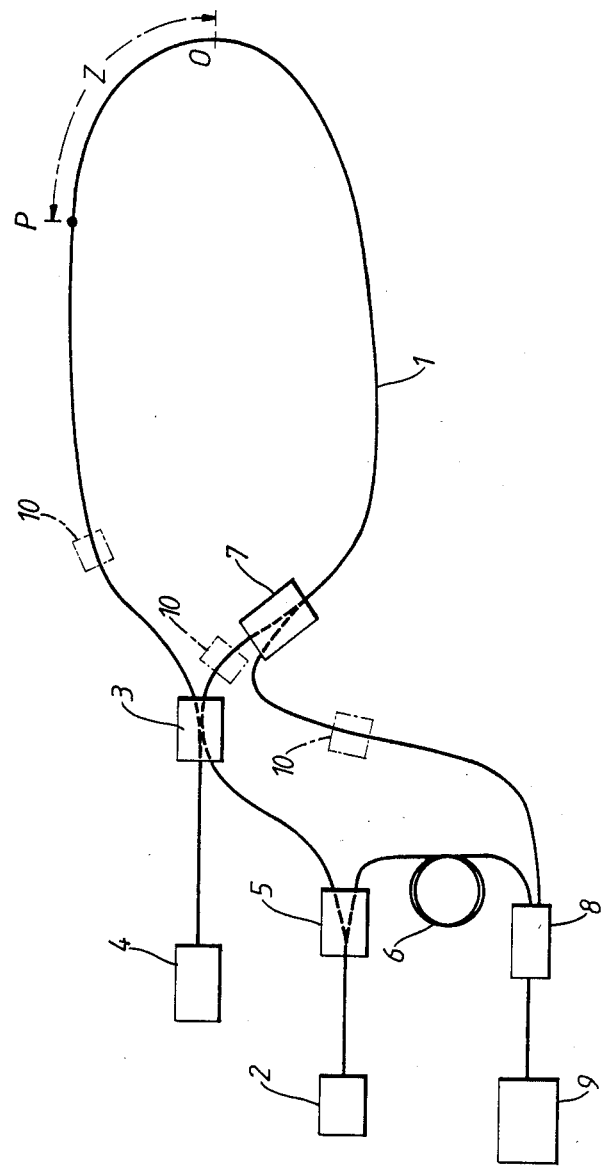

OPTICAL FIBER SENSING SYSTEMS

This invention relates to optical fibre sensing systems and relates more specifically to such systems comprising an optical fibre sensor which extends over a predetermined path to be monitored by the sensing means for determining changes in temperature, pressure and other parameters at a variably located single point along said path with the position and or magnitude of such changes being measured by the system. The present invention is suitable for measuring temperature, as in the detection of fire or electrical faults or for measuring mechanical strain, as is required for intruder detection or vehicle position sensing, for example.

It is well known in the case of optical fibre gyroscopes comprising a bi-directional optical fibre loop Sagnac interferometer that if a point asymmetrically situated relative to a light source/detector coupling point on the optical fibre loop is subjected to an external phase modulating parameter, such as a temperature change or mechanical strain in the fibre, then a phase change y will be detected by an output detector when the phase change x caused by the parameter varies with time. The phase change detected by the output detector will be proportional to the rate of change of x with time and the distance of the phase modulation point along the optical fibre loop from the centre of the loop, the loop centre being situated such that the lengths of the two fibre paths connecting it to the light source/detector coupler are equal. Thus, any time-varying influence on the optical fibre which is not situated at the centre of the coil will in general cause a phase shift y approximated by $$y = \frac{2Z}{V} \cdot \frac{dx}{dt}$$

where V is the velocity of light in the optical fibre and (dx/dt) is the rate of change of phase x with time t at a distance Z of the phase modulation point from the centre of the coil.

According to the present invention there is provided an optical fibre sensing system for measuring the location and/or magnitude of an external parameter acting at a single point along an optical fibre loop sensor, in which the system comprises light source means for producing light for propagation around said loop sensor, directional coupler means for coupling said light source means and detector means to said loop sensor and to other optical fibre paths of the system, in which the detector means are arranged for measuring a phase change (x) between light propagating around the loop sensor in opposite directions and for simultaneously measuring a phase change (y) experienced by the light propagating around the loop in one direction, whereby, by computation or otherwise, the rate of change of the phase change x can be derived and by use of the previously referred to algorithm the location and/or magnitude of the parameter can be determined.

The rate of change of the phase change x for determining the factor (dx/dt) may be determined either by electronic differentiation of a voltage or current proportional to y, or it may be computed by a digital electronic computer from the measured values of x as a function of time.

By way of example, the present invention will now be described with reference to the accompanying drawing which diagrammatically depicts an optical fibre sensing system according to the present invention.

Referring to the drawing, the optical fibre sensing system comprises an optical fibre loop sensor 1, which will extend over a predetermined path which is to be monitored for determining a particular parameter acting at a specific point along the fibre sensor 1.

A light source 2 is provided for producing light signals for propagating around the loop sensor 1 in opposite directions by an optical directional coupler 3 which also directs a proportion of the returning light to a first optical detector 4. Optical interference between these light signals propagating in opposite directions around the loop sensor 1 enables a phase change (x) between the two opposite loop paths to be monitored by the optical detector 4. Before the light derived from the light source 2 reaches the optical directional coupler 3 it passes through a directional coupler 5, which also directs a proportion of the light through an optical fibre coil 6 of fixed length. A further directional coupler 7 directs a proportion of light propagating in the clockwise direction around the optical fibre loop sensor 1 to a still further optical directional coupler 8, which combines the light propagating along the coil 6 with part of that propagating in a clockwise direction around the optical loop sensor 1. The interference between the light combined by the coupler 8 is detected by means of a detector 9, which enables the relative phase shift y between the optical paths to be measured.

From the measured values of the phase change x and relative phase change y the distance Z of a point P on the loop sensor 1, where a specific parameter (e.g. temperature, pressure etc.) is acting to produce a phase change in the propagating light signals can be determined.

The arrangement described comprises a single homodyne interference arrangement where the interfering light signals are of the same optical frequency, except for transient variations due to phase change x resulting from the action of a specific parameter acting at the point P along the length of the loop sensor 1. Since there may be difficulties in providing stable operation of the system at quadrature phase bias and, moreover, operation of the system may be affected by changed in the power of the optical light source 2, the loop sensor 1 may incorporate means for producing a pre-determined frequency change in or between the sensing loop and the other loop or loops which causes an alternating phase shift to be applied. To this end a frequency modulator (e.g. Bragg cell) or phase modulator driven by an alternating signal may be introduced into the optical fibre arrangement at the alternative positions as shown at 10 in order to allow computation of the additional required phase changes y and x to be obtained by well-known gyroscope processing techniques free from errors due to amplitude fluctuations of the light source 2.

In order to prevent many alternative optical paths from causing problems in the sensing system, it may prove advantageous to use a relatively short coherent length light source 2, such as a semi-conductor laser, in conjunction with the close matching of the lengths of the pairs of interfering optical paths. Then, any alternative paths which might occur, for example, due to undesired optical reflections in the directional couplers or fibre to fibre joints in the optical paths will, in general, due to the unlikelihood of coincidental length matching, suffer a poorer contrast of undesirable interfering fringes than the interferometry between the desired matched paths.

The optical fibres and directional couplers in the system may be of a type which preserve the polarisation of light propagating through them in order to ensure that the maximum fringe contrast is preserved at all times.

The main advantage of the system of the present invention is the ability to compute the distance Z from the centre of the measurement loop and hence locate the position of an optical phase-changing parameter within the loop provided there is only one time-dependent influence occurring at a particular moment in time.

However, if two or more influences with different temporal variations are applied, it may be possible to separate the two signals by separation in the time or frequency domain.

Purely by way of example the optical sensing system according to the present invention may be utilised for the following purposes:
  (a) location of a source of sudden heat, such as may occur in the event of a fire or electrical fault etc;
  (b) location of a source of sudden cold or heat which might be due to the leakage of a cold or hot liquid or gas;
  (c) location of localised fibre strain, due, for example, to a pressure change resulting from direct pressure on the optical fibre cable or acoustic or seismic influence near to the cable. This could form the basis of an intrusion detection system such as a burglar alarm system;
  (d) location of a localised strain due to a fault, such as a crack or high stress in a mechanical structure, or location of earth movements which might herald a possible earthquake;
  (e) location of the position of a vehicle on a road or rail system by means of localised strain induced in a fibre mechanically coupled to the load-bearing surfaces; and,
  (f) location of the position of a depressed key on a keyboard by allowing the key to strain the fibre.

I claim:

1. An optical fibre sensing system for measuring the location and/or magnitude of an external parameter acting at a single point along an optical fibre loop sensor, in which the system comprises light source means for producing light for propagation in opposite directions around said loop sensor, directional coupler means for coupling said light source means and detector means to said loop sensor and to other optical fibre interfering paths of the system, in which the detector means are arranged for measuring a phase change (x) between interfering light signals propagating around the sensor loop in opposite directions and for simultaneously measuring a phase change (y) experienced by the light propagating around the loop sensor in one direction, whereby, by computation or otherwise, the rate of change of the phase change (x) can be derived and by the use of the algorithm herein defined the location and/or magnitude of the applied parameter can be determined.

2. An optical fibre sensing system as claimed in claim 1, in which the light produced by the light source means passes through a first directional coupler which directs respective parts of said light into a second directional coupler which divides one of said respective parts into two equal parts which propagate in opposite directions around said loop sensor so as to interfere with one another and into a preferably coiled optical fibre, in which a third directional coupler combines the light received from said preferably coiled optically fibre and with that part of the light propagating around the optical fibre loop sensor in one direction derived from a fourth directional coupler, and in which a first optical detector measures the phase change (x) between the interfering light signals propagating in opposite directions around the optical fibre loop sensor and received via the second directional coupler and a second optical detector measures the phase shift (y) from the combined interfering light signals received via the fourth directional coupler.

3. An optical fibre sensing system as claimed in claim 2, in which the light source means comprises a relatively short coherent light source (e.g. semi-conductor laser) and the lengths of the interfering light paths including the coiled fibre and the loop sensor are closely matched.

4. An optical fibre sensing system as claimed in claim 2, in which frequency modulating or phase modulating means are positioned at predetermined alternative points in the optical fibre loop sensor and other interfering light paths so that either or both of the interfering light paths are subjected to the frequency or phase change.

5. An optical fibre sensing system as claimed in claim 2 or 3, in which the optical fibres and the directional couplers preserve the polarisation of light propagating through them.

* * * * *